United States Patent [19]

Braun

[11] Patent Number: 5,052,084
[45] Date of Patent: Oct. 1, 1991

[54] ELASTIC STRAP FASTENER ASSEMBLY

[75] Inventor: David L. Braun, St. Paul, Minn.

[73] Assignee: Minnesota Mining and Manufacturing Company, St. Paul, Minn.

[21] Appl. No.: 424,546

[22] Filed: Oct. 20, 1989

[51] Int. Cl.[5] .............................................. A44B 11/02
[52] U.S. Cl. ............................... 24/163 R; 128/206.27
[58] Field of Search .................. 128/206.27; 24/163 R, 24/169, 300, 301, DIG. 16, 90 C, 90 HA; 264/251, 252

[56] References Cited

U.S. PATENT DOCUMENTS

D. 137,208  2/1944  Schreiber .
4,735,753  4/1988  Ackermann ........................ 264/251

OTHER PUBLICATIONS

Catalog Pages 1, 2, 10 and 16, "Air-Purifying Respiratory Protection Equipment", Published by Pro Tech Respirators, Inc.

Primary Examiner—Edgar S. Burr
Assistant Examiner—Stephen R. Funk
Attorney, Agent, or Firm—Gary L. Griswold; Walter N. Kirn; David Anderson

[57] ABSTRACT

A respirator harness of polymeric components and elastic straps can be made in a 2-part injection mold in a single step. The elastic straps can have superior resistance to pull-out when secured to each polymeric component by a cage that is intergral with the polymeric component, and the cage has at least one transverse rib that is fused to the elastic strap and around which the strap is stretched.

8 Claims, 2 Drawing Sheets

ELASTIC STRAP FASTENER ASSEMBLY

BACKGROUND OF THE INVENTION

1. Field of the Invention

The invention is concerned with an elastic strap fashener assembly, particularly in the form of a respirator harness that employs polymeric components in conjunction with elastic straps.

2. Description of the Related Art

A typical respirator harness is made of polymeric components and elastic straps which are sewn, mechanically secured, or ultrasonically welded to the polymeric components. Doing so requires a first step of molding the polymeric components and then a separate step of attaching each strap to one or more of the polymeric components.

Visual inspection of Respirator Model 1482 of Pro-Tech Respirators, Inc., Buchanan, Mich., indicates that part or all of the harness has been made in a single step. That is, an elastic strap has been laid at the parting line of a 2-part injection mold and so becomes part of the harness when a polymeric component is formed around an end of the strap. Such inspection also indicates that a series of vanes at the face of a each part of the injection mold abutted each other at the elastic strap when the mold was closed and that the injected composition formed a polymeric cage encompassing an end of the elastic strap. The cage has a peripheral frame interconnected by a central bridgework consisting of longitudinal stringers that were formed in the valleys between the vanes and are fused to opposite faces of the strap. The stringers bridge the transverse members of the frame and keep the elastic strap at approximately the location of a plane bisecting the thickness of the cage.

SUMMARY OF THE INVENTION

The present invention provides an elastic strap fastener assembly such as a respirator harness which, like the harness of the Pro-Tech Model 1482 respirator, can be made in a single step. As compared to the Pro-Tech respirator, the strap(s) of the elastic strap fastener assembly of the invention have significantly greater pull-out resistance. Hence, the novel strap fastener assembly provides a more robust and reliable respirator harness than the Pro-Tech harness. Briefly, the elastic strap fastener assembly of the invention, like that of the Pro-Tech fastener assembly, has at least one elastic strap, a polymeric cage encompassing a portion of the elastic strap, which cage has a peripheral frame and central bridgework that interconnects the peripheral frame and is fused to both faces of the strap.

The polymeric cage of the elastic strap fastener assembly of the invention differs from the Pro-Tech strap assembly in that at least one portion of the central bridgework stretches the strap away from the location of a plane which bisects the thickness of the cage.

Preferably, the elastic strap is permeable, and any portion of the bridgework that stretches the strap also penetrates into interstices of the elastic strap, thereby enhancing the pull-out resistance of the elastic strap. An elastic strap of more open construction enhances penetration. Generally, better penetration occurs where the strap is stretched than where it is not. Higher strap porosity produces greater penetration and less deflection or stretching of the strap.

When the elastic strap is impermeable, the materials of the elastic strap and the polymeric cage preferably are selected to form strong bonds to each other. For example, the elastic strap may be a block copolymer of polystyrene end blocks and an ethylene/-butylene copolymer midblock (e.g., Kraton G styrene/butadiene/styrene block copolymer from Shell Chemical), and the polymeric cage may be polypropylene. Bonding between those materials is enhanced by blending a small proportion (e.g., 5-10%) of polypropylene with the block copolymer prior to forming the strap.

Preferably, the bridgework of the polymeric cage includes at least one transverse rib around which the strap in stretched. More preferably, there are at least three such transverse ribs, and the elastic strap undulates around opposite sides of adjacent of said transverse ribs.

Usually the polymeric cage encompasses one end of the elastic strap, but it could encompass a portion of the elastic strap intermediate of its ends.

Preferably the peripheral frame of the polymeric cage is substantially rectangular and continuous, and the strap emerges from a slot formed in the end of the frame. For esthetics, where the strap emerges from a rectangular frame, the transverse element of the frame should have a width not exceeding the nominal thickness of the elastic strap, thus better assuring good centering of the strap.

When the elastic strap fastener of the invention is a respirator harness, it may include a 2-piece polymeric head cradle, two polymeric connectors, and four elastic straps. Integral with each piece of the head cradle and with each of the polymeric connectors is a polymeric cage that secures one end of one elastic strap. The other end of each strap can be connected to the respirator by adjustment buckles.

All of the polymeric components of a respirator harness can be formed and secured to the elastic straps simultaneously using a novel 2-part injection mold that is formed at its parting line to receive each elastic strap. Where each elastic strap is received, each mold part can be formed with at least one open cavity that is elongated in the transverse direction, opposed to a like cavity of the other mold part, and closed by the received strap when the mold is closed. A first of said mold parts is formed with a secondary gate that opens into the interior of said enlongated cavity to allow an injected polymeric composition to stretch the elastic strap into the opposing elongated cavity of the second of said mold parts, thus causing the strap to become partially wrapped around the transverse polymeric rib that forms in said pair of opposed elonged cavities.

Using the novel 2-part injection mold, an elastic strap fastener assembly of the invention can be made by laying an elastic strap between the two mold parts to close said elongated transverse cavities, closing the mold, injecting a polymeric composition into the mold and through said secondary gate under a pressure sufficient to stretch the elastic strap into the opposing elongated transverse cavity, and hardening the polymeric composition to freeze the elastic strap in said stretched condition.

The transverse polymeric rib that is formed in each pair of said opposing elongated cavities sometimes is completely obscured by the strap when the resulting polymeric cage is viewed from the side toward which the strap is stretched. On the other hand, when the elastic strap is quite porous or molding pressures are high, the polymer may flow through the strap, thereby completely encapsulating a portion of the elastic strap and enhancing the pull-out resistance of the strap. In such event, the degree to which the strap is stretched may be almost indiscernible.

Like many respirator harnesses of the prior art, an elastic strap fastener assembly of the invention preferably employs an elastic strap that has a plurality of rubber strands knit together in parallel configuration with cotton or synthetic threads. Other useful elastic straps are strips of woven or nonwoven elastic fibers. Also useful are strips of elastomer.

BRIEF DESCRIPTION OF THE DRAWING

The invention may be more easily understood in reference to the drawing, all figures of which are schematic. In the drawing.

DETAILED DESCRIPTION

Figure 1:
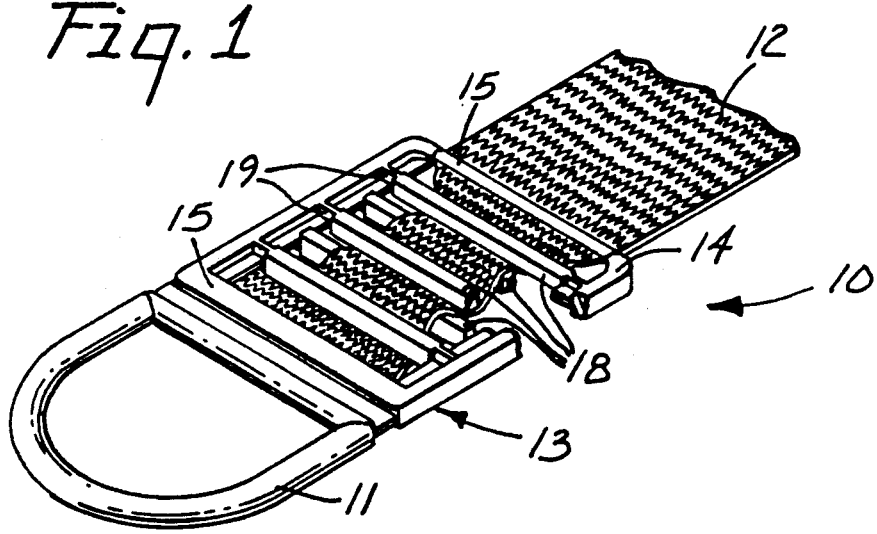
FIG. 1 is an isometric view, partly cut away to show details, of a polymeric component of a first respirator harness that incorporates an elastic strap fastener assembly of the invention.

In FIG. 1, a polymeric cage 10 is integral with a connector loop 11 of a respirator harness. The polymeric cage, which encompasses one end of an elastic strap 12, has a rectangular peripheral frame 13 including longitudinal elements 14 extending along the sides of the elastic strap 12 and transverse elements 15 at each end of the cage. Bridging the longitudinal elements 14 are five transverse ribs 18 around which the strap undulates and is stretched. In FIG. 1, the elastic strap is cut away to show the shape of the transverse ribs 18, the ends 19 of which have been formed by secondary gates and are of somewhat reduced size.

Figure 2:
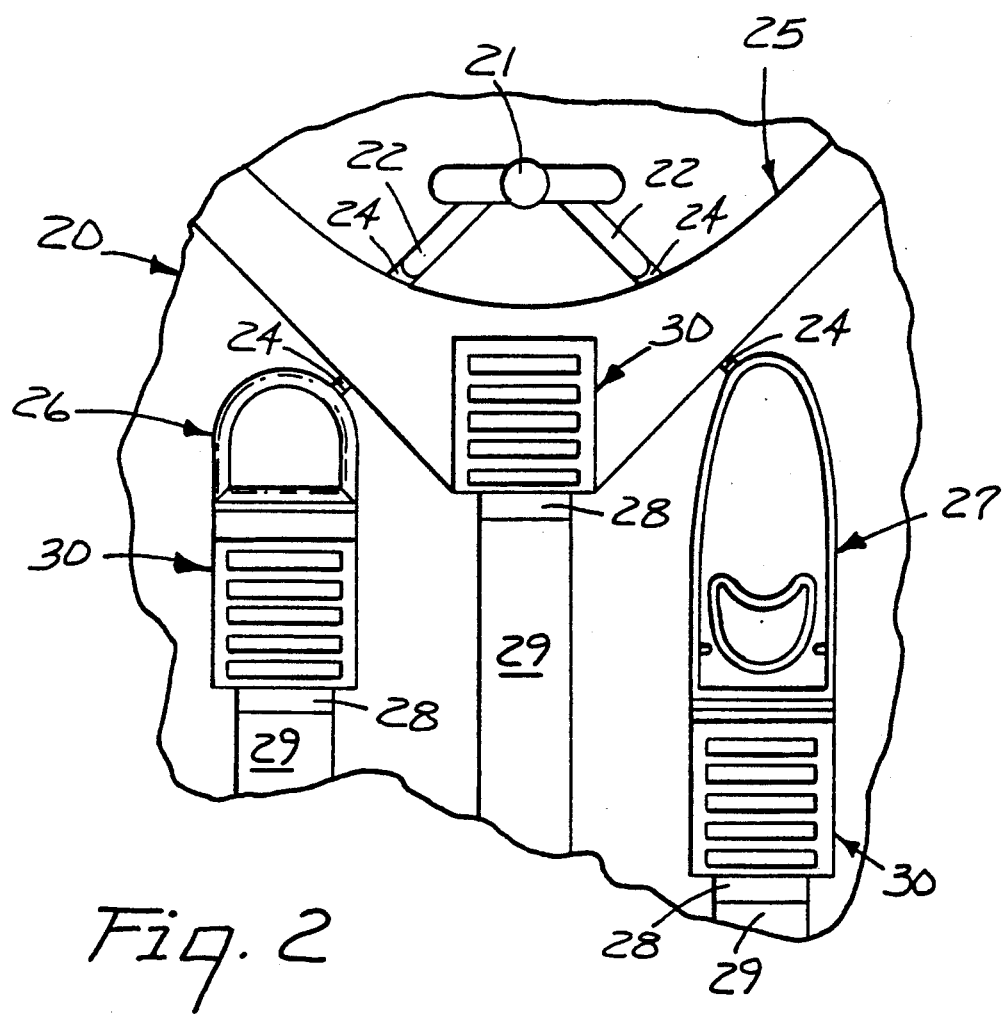
FIG. 2 is a plan view of the face of one part of a 2-part injection mold for making a second respirator harness of the invention.

In FIG. 2, one part 20 of a 2-part injection mold includes a sprue 21 and a pair of runners 22 that feed three networks through four primary gates 24. The first network 25 forms one piece of a 2-piece head cradle and an integral polymeric cage. The second and third networks 26 and 27 form loop and hook connectors respectively, each having an integral polymeric cage. The cage-forming portions 30 of the networks 25, 26 and 27 are identical. Recessess receive elastic straps (not shown) to overlie each of the cage-forming portions of the networks. Channel 29 of each recess does not compress the straps, while shutoffs 28 compress the straps to prevent polymer leakage.

Figure 3:
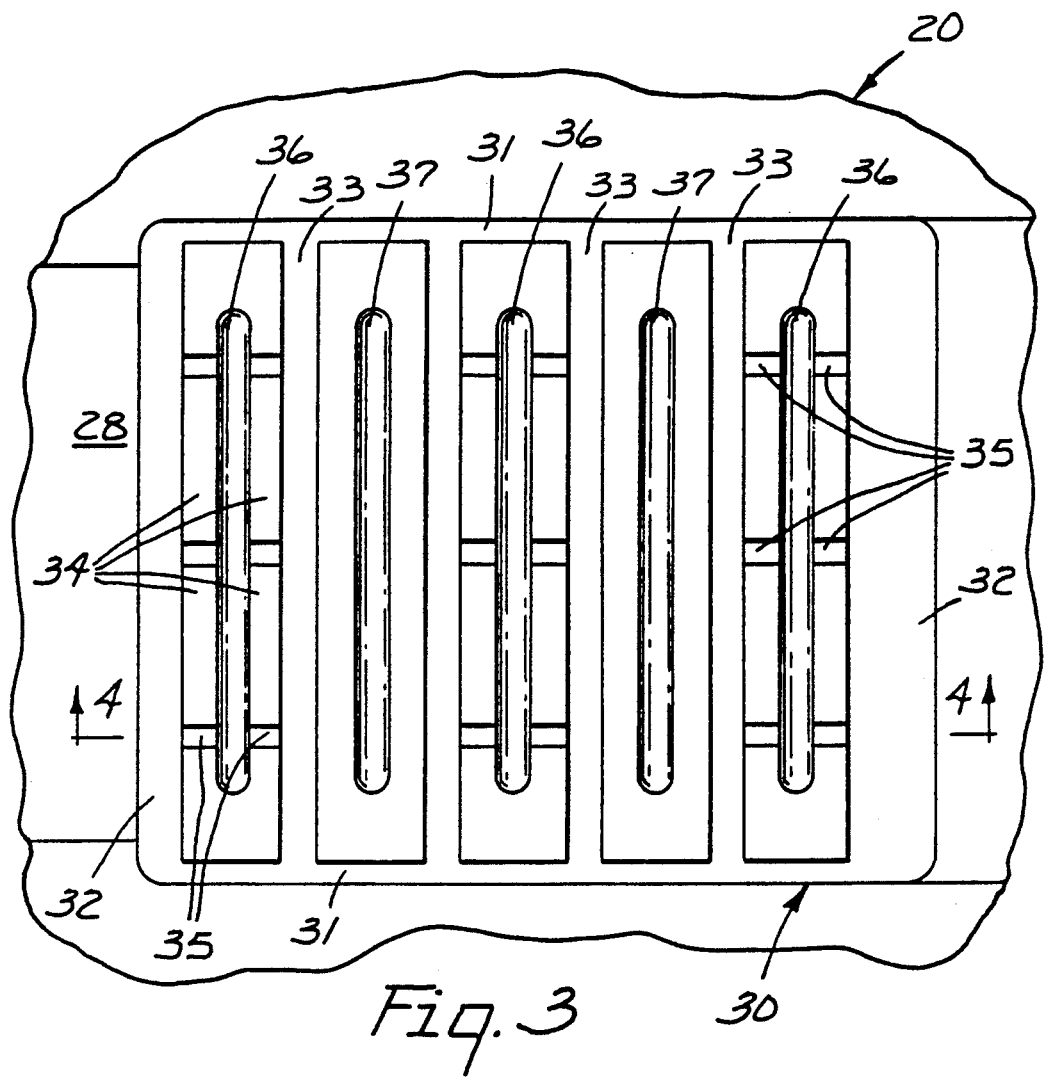
FIG. 3 is an enlarged detail of a portion of the mold part of FIG. 2 at which a polymeric cage is produced.
Figure 4:
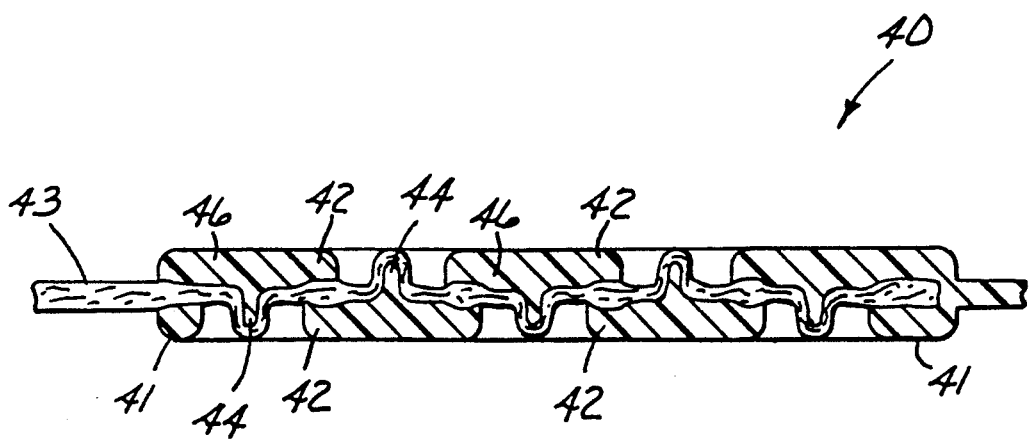
FIG. 4 is a cross section through an elastic strap fastener assembly that has been produced using the mold, one part of which is shown in FIGS. 2 and 3, which section is taken at line 4-4 of FIG. 3.

Details of the cage-forming portion 30 of one of the networks 25, 26 and 27 are shown in FIG. 3, and indirectly by FIG. 4. In FIG. 3, a pair of longitudinal cavities 31 and a pair of transverse cavities 32 cooperate with identical cavities of the other part of the injection mold to form a continuous rectangular frame at the periphery of the polymeric cage. The cage-forming portion 30 includes longitudinal cavities 31 which are interconnected by a first set of elongated transverse cavities 33, at the edges of which are a plurality of vanes 34. The vanes extend beyond the edges of a strap (not shown) that is to be laid in the channel 29 and shutoff 28 to overlie the cage-forming portion 30. Abutting vanes 34 compress the strap to the same degree as do the shutoffs 28, except at secondary gates 35 which interconnect the first elongated transverse cavities 33 with three elongated transverse cavities 36 of a second set. The second part (not seen) of the injection mold is substantially identical to the first part 20 except that its secondary gates connect only to two elongated transverse cavities that are opposed to two elongated cavities 37 of said second set that alternate with said three elongated cavities 36.

The injection of polymer into the mold produces an elastic strap fastener assembly 40 as shown in FIG. 4. In doing so the polymer progressively fills the pair of transverse cavities 32 and the pair of longitudinal cavities 31 to form a rectangular peripheral frame 41, while also filling the first elongated transverse cavities 33 to form a series of first transverse ribs 42. The peripheral frame 41 and the series of first transverse ribs positions a permeable elastic strap 43 at the location of a plane which bisects the thickness of the cage.

Polymer flowing through the secondary gates 35 directly into the elongated transverse cavities 36 of the second set stretches the elastic strap 43 into the opposed cavities 37 to form a second series of transverse ribs 44. At each of the second series ribs 44, the polymer penetrates into interstices of the elastic strap and fuses to hold the strap in undulations around alternate sides of the transverse ribs of the second series. Where that second series of ribs 44 forms at the gates 35, there are polymeric bridges 46 between the first and second series of transverse ribs. These bridges 46 have been found to enhance the resistance of the second series of transverse ribs 44 to rotation when the fastener assembly 40 is subjected to pull-out forces.

COMPARATIVE EXAMPLE

The harness assembly was removed from each of two Model 1482 half-mask respirators available from Pro-Tech Respirators, Inc. The force needed to pull the elastic strap (18 mm width) free from the molded plastic part was measured using a Chatillon force gauge, Model DRC100, in which tension was applied by attaching the free end of the strap to a clamp moving at 9.7 mm/second away from the force gauge such that the direction of applied tension was on the measurement axis of the force gauge. In each test there was a 90 mm length of the unstretched elastic strap between the force gauge clamp and the moving clamp at the start of the test.

In testing each of the respirators, an elastic strap was pulled out of six molded plastic parts. Test results are reported in Table I. The pull-out force is considered to be directly proportional to strap width and the results are reported based on a unit width of 10 mm.

TABLE I

|  | Number of Tests | Pull-Out Force (N/10 mm) | Standard Deviation (N/10 mm) |
| --- | --- | --- | --- |
| First Respirator | 6 | 28 | 3.8 |
| Second Respirator | 6 | 32 | 4.6 |

EXAMPLE 1

An injection mold for the elastic strap fastener assembly shown in FIG. 1 (except having smaller secondary gates) was installed in a 75-ton horizontal Van Dorn injection molding press, Model 75-RS-3F, equipped with a 148 cm$^3$ (5 ounce) barrel and standard screw. Molding conditions used were: 1) barrel rear temperature 243° C. (470° F.); 2) barrel front temperature 254° C. (490° F.); 3) nozzle temperature 266° C. (510° F.); 4) mold temperature nozzle side 21° C. (70° F.), ejector side 38° C. (100° F.); 5) injection velocity 0.9 cm (0.35 inches) per second; 6) hydraulic pressure 81.6 bar (1200 psig); 7) first-stage injection pressure, 782 bar (11,500 psig); 8) second-stage injection pressure, 748 bar (11,000 psig); 9) boost time 2.6 seconds; 10: injection forward time 0.2 seconds; 11) hold time 2.0 seconds; 12) zero back pressure and no screw pullback; 13) shot size 2 cm (0.80 inches); 14) cushion 0.6 cm (0.25 inches).

Injection molding grade polypropylene, product no. 5B56N from Huntsman Chemical Corp., Salt Lake City, Utah, was combined with 3% dark gray colorant CBE70882P available from C.B. Edwards and Company, Inc., Minneapolis, Minn. and was used to produce elastic strap fastener assemblies of the invention using two different 12.5 mm wide elastic straps. Each of the elastic straps had a plurality of parallel rubber strands which were knit together (Nos. 4422 and 6192 available from Providence Braid Co., Inc. Pawtucket, R.I.). The assemblies were tested after storage for 5 days at room temperature and according to the procedure of the Comparative Example. Results are reported in Table II.

TABLE II

| Elastic Strap | Number of Tests | Pull-Out Force (N/10 mm) | Standard Deviation (N/10 mm) |
| --- | --- | --- | --- |
| No. 4422 | 12 | 44 | 3.6 |
| No. 6192 | 12 | 41 | 8.2 |

Examination of failed parts indicated that individual transverse ribs had rotated during pull-out of the elastic strap. This was attributed to the small size of the secondary gates, suggesting that an even higher pull-out force would be attained by designing the transverse ribs to resist rotation (as do the transverse ribs of polymeric cages shown in FIG. 1 of the drawing).

EXAMPLES 2-4

The elastic strap fastener assembly of FIG. 4 was molded and tested according to the conditions of Example 1 except for changes in the polymer and the elastic straps as indicated in Table III. Improved rib stabilization resulted in higher pull-out resistance as reported in Table III.

TABLE III

| Example | Polymer | Elastic Strap | Number of Tests | Pull-out Force (N/10 mm) | Standard Deviation (N/10 mm) |
| --- | --- | --- | --- | --- | --- |
| 2 | "Huntsman" 5B56N | Providence 6192 | 10 | 60 | 5.2 |
| 2* | "Huntsman" 5B56N | Providence 6192 | 10 | 66 | 7.1 |
| 3 | "Huntsman" 5B56N | Providence SK531 | 10 | 85 | 5.5 |
| 4 | "HiMont" 6523** | Providence 4422 | 4 | 80 | 8.5 |

*Tested at room temperature after 5 days at room temp. plus 6 days at 65° C. (150° F.)
**Injection molding grade polypropylene having a lower melt viscosity than that of "Huntsman" 5B56N. Product no. 6523 from Himont U.S.A., Inc., Wilmington, Delaware.

In testing the elastic strap fastener assemblies of Example 3, the elastic strap (SK531) did not pull out of the polymeric cages but failed by breaking and badly fraying. Examination of the fastener assemblies of Example 3 indicated that the polymer completely encapsulated the strap at each of the intermediate transverse ribs, the penetration being attributed to the highly porous nature of the SK531 elastic strap. In Example 4, the polymer penetrated completely through the elastic strap, but some threads of the strap were visible. This degree of penetration was much greater than was achieved in Example 2 and was attributed to the lower melt viscosity of the "Himont" polymer. In Example 2, there was some penetration, but the elastic strap nearly obscured each transverse rib around which it was stretched. When the polymer freely penetrates through the elastic strap from one side, the strap may not be appreciably deflected, but even if there were no deflection, complete penetration would confer high resistance to pullout.

I claim:
1. An elastic strap fastener assembly comprising an elastic strap having two opposite faces and a polymeric cage encompassing a length of the elastic strap, which cage has a peripheral frame including two longitudinal elements, each longitudinal element disposed adjacent a respective longitudinal side of said strap, said longitudinal elements being interconnected by at least two first transverse ribs extending across and fused to a face of said strap, with consecutive first transverse ribs extending across and fused to opposite faces of said strap and including opposed portions terminating approximately at a plane bisecting the thickness of said cage to maintain a portion of said strap between said opposed portions substantially at said plane bisecting the thickness of said cage, said first ribs further including second ribs extending from said first ribs to stretch said strap away from said plane bisecting the thickness of said cage.

2. An elastic strap fastener assembly as defined in claim 1 wherein the polymeric cage has at least three of said first and second transverse ribs, and the elastic strap undulates around opposite sides of adjacent said first and second transverse ribs.

3. An elastic strap fastener as defined in claim 1 wherein the elastic strap is permeable, and the polymer of the cage penetrates into interstices of the elastic strap where the second transverse ribs stretch the strap.

4. An elastic strap fastener assembly as defined in claim 1 wherein the polymeric cage encompasses an end of the elastic strap.

5. An elastic strap fastener assembly as defined in claim 1 wherein the elastic strap comprises a plurality of rubber strands knit together in a parallel configuration with cotton or synthetic threads.

6. An elastic strap fastener assembly as defined in claim 1 wherein the elastic strap comprises a strip of woven or nonwoven elastic fibers.

7. An elastic strap fastener assembly as defined in claim 1 wherein the elastic strap comprises a strip of elastomer.

8. An elastic strap fastener assembly as defined in claim 1 wherein the peripheral frame is continuous and is formed with a slot through which said elastic strap emerges.

* * * * *